3,030,363
DERIVATIVES OF XANTHINE

Wilhelm Konz and Karl Zeile, Ingelheim, Germany, assignors to C. H. Boehringer Sohn, Ingelheim (Rhine), Germany, a limited partnership of Germany
No Drawing. Filed June 8, 1960, Ser. No. 34,648
Claims priority, application Germany June 10, 1959
6 Claims. (Cl. 260—256)

The present invention relates to novel N,N'-substituted diamines and various methods of preparing these compounds.

More particularly, the present invention relates to compounds having the general structural formulas

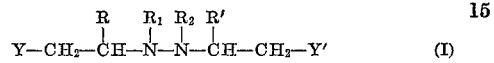
(I)

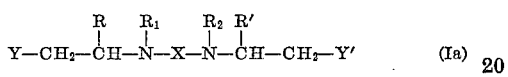
(Ia)

and

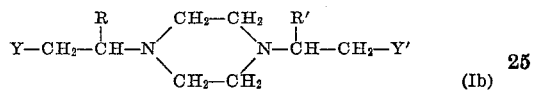
(Ib)

wherein

R and R' are selected from the group consisting of hydrogen and lower alkyl, preferably with 1 to 5 carbon atoms, $R_1$ and $R_2$ are selected from the group consisting of hydrogen and alkyl, preferably lower alkyl, X is selected from the group consisting of alkylene with 1 to 12 carbon atoms, lower alkyl-substituted alkylene with 1 to 12 carbon atoms, and cyclohexamethylene, and Y and Y' are selected from the group consisting of Xanthine-yl-(1)

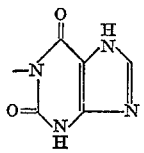

Xanthine-yl-(3)

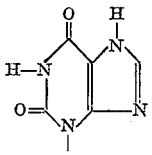

Xanthine-yl-(7)

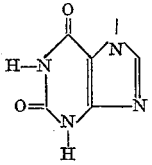

3,7-di-lower alkyl-xanthine-yl(1)

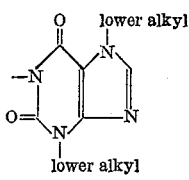

1,7-di-lower alkyl-xanthine-yl-(3)

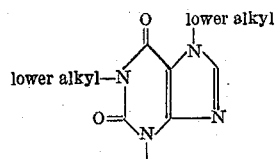

and 1,3-di-lower alkyl-xanthine-yl-(7)

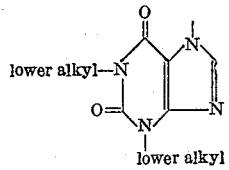

and their non-toxic, pharmacologically useful acid addition salts.

The compounds according to the present invention may be prepared by a number of different methods. However, those which have been found to be most advantageous are the following:

(1) By reacting a compound of the formula

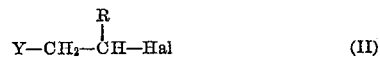
(II)

or

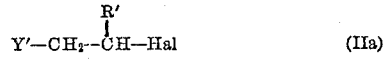
(IIa)

wherein Y and Y' have the meanings defined above and Hal is a halogen, with a diamine of the formulas

(III)

(IIIa)

or

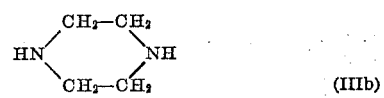
(IIIb)

wherein $R_1$, $R_2$ and X have the meanings defined above, at elevated temperatures.

In general, one half mol diamine is used for each mol of Compound II or IIa in this reaction. The reaction may be carried out with or without a solvent, and the hydrogen halide split off by the reaction is neutralized by suitable additives, such as calcium carbonate, sodium carbonate, triethylamine or pyridine. Similarly, it is also possible to neutralize the hydrogen halide by using a corresponding excess of the diamine. A preferred embodiment of this process is the operation without a solvent, wherein one mol of Compound II or IIa is reacted with one mol of diamine at temperatures of 80 to 200° C.

Depending upon their properties, the reaction products are isolated by digestion with water and separation of the desired end products which are difficultly soluble in water, or by extraction with a solvent which is immiscible with water, such as chloroform. In other cases, the reaction products may be isolated by boiling the reaction mixture with alcohol, chloroform etc. Examples of suitable starting materials for this process are the following: 7-(β-chlorethyl)-theophylline and 1-(β-chlorethyl)-theobromine as compounds of the Formula II, and hydrazine, ethylenediamine, trimethylenediamine, tetramethylenediamine, dodecamethylenediamine, N,N' - diethyl - ethylene-diamine, N,N'-diethyl-hexamethylenediamine and piperazine as compounds of the Formula III, IIIa or IIIb.

The present method may also be used to produce those compounds having the structural Formulas I, Ia and Ib, which contain two different purine radicals. This embodiment of the reaction is carried out in two steps, for example by first condensing one-half mol of a compound of the Formula II with more than one mol of a diamine of the Formula III, IIIa or IIIb and then reacting the condensation product with one-half mol of a compound of the Formula IIa wherein Y' is different from Y in Compound III. For example, this method may be used to produce hexamethylene-bis-amino-N-(7-ethyl-theophylline - N' - (1 - ethyl-theobromine) and trimethylene-bis-amino-N-(7-ethyl-theophylline) - N'-(7-ethyl-1,3-diethyl-xanthine).

(2) Condensation of a compound having the structural formulas

$$Y—CH_2—COR \quad (IV)$$
or
$$Y'—CH—COR' \quad (IVa)$$

wherein Y, Y', R and R' have the meanings previously defined, with a diamine of the Formula III or IIIa, wherein $R_1$ and $R_2$ are hydrogen accompanied by simultaneous hydrogenation. The bis-Schiff's bases may also be produced first and may then be subjected to catalytic hydrogenation with or without pressure at room temperature in the presence or absence of a solvent. For example, under these reaction conditions theophylline-7-acetaldehyde and trimethylenediamine form N,N'-bis-(7-ethyl-theophylline)-trimethylenediamine, and 7-(β-oxopropyl)-theophylline and hexamethylenediamine produce N,N'-bis-[7-(β-propyl) - theophylline]-hexamethylenediamine. Method 2 may also be carried out stepwise to prepare compounds having the Formulas I or Ia in which radicals Y and Y' are different from each other.

(3) Condensation of a compound having the structural formulas

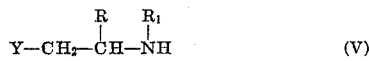
$$Y—CH_2—CH—NH \quad (V)$$
with R, $R_1$ above or

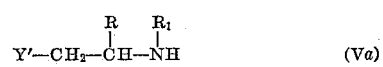
$$Y'—CH_2—CH—NH \quad (Va)$$

wherein Y, Y', R and $R_1$ have the meanings defined above, with dihalo-alkylenes in the presence or absence of solvents at elevated temperatures and in the presence of acid neutralizing agents.

(4) Condensation of a compound having the structural formulas $$Y—H \quad (VI)$$
or
$$Y'—H \quad (VIa)$$

wherein Y and Y' have the meanings previously defined, or their alkali metal salts with a compound having the general formulas

$$Hal—CH_2—CH—N—N—CH—CH_2—Hal \quad (VII)$$

$$Hal—CH_2—CH—N—X—N—CH—CH_2—Hal \quad (VIIa)$$

or

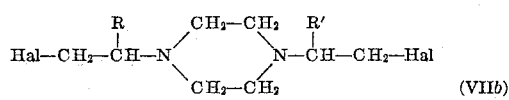
(VIIb)

wherein R, R', $R_1$, $R_2$ and X have the meanings indicated above and Hal is a halogen.

Advantageously, the alkali metal salts of Compounds VI or VIa are reacted in dimethylformamide as a solvent with the bis-halo derivatives VII, VIIa or VIIb, in accordance with French Patent 1,171,968. If the stability of the bis-halo derivatives permits it, the reaction may also be carried out in aqueous, alcoholic solution or in suspension in the presence of an acid-neutralizing agent. The condensation may also be carried out in two steps whereby compounds with two different radicals Y and Y' may be obtained.

(5) Hydrogenating condensation of a compound having the structural formulas

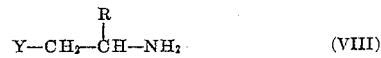
$$Y—CH_2—CH—NH_2 \quad (VIII)$$
or
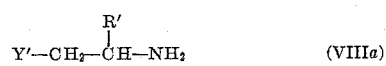
$$Y'—CH_2—CH—NH_2 \quad (VIIIa)$$

wherein Y, Y' and R have the meanings defined above, with bis-carbonyl compounds of the general formula

$$OC—CO \quad (IX)$$
or
$$OC—X—CO \quad (IXa)$$

wherein $R_3$ and $R_4$ are hydrogen or a lower alkyl radical and X has the meanings defined above; this reaction may be preceded by the formation of the bis-Schiff's base on both sides.

The reaction conditions are the same as those described under method 2.

The present method makes it possible to obtain those compounds having Formulas I, Ia and Ib in which $R_1$ and $R_2$ represent hydrogen. By subsequent alkylation it is also possible to obtain those compounds in which $R_1$ and $R_2$ are alkyl radicals.

This process may also be carried out in two steps so that compounds with two different radicals Y and Y' may be obtained.

(6) Condensation of compounds having the structural formulas

$$Y—CH=CH \quad (X)$$
or
$$Y'—CH=CH \quad (Xa)$$

wherein Y, Y' and R have the above indicated meanings, with diamines of the Formulas III, IIIa or IIIb. The reaction is carried out in the presence or absence of a solvent, and possibly in the presence of a catalyst, such as an alkali, an alkali metal, an alkali metal amide or cuprous acetate.

This process may also be carried out stepwise so as to obtain compounds of the Formulas I and Ia with different radicals Y and Y'.

(7) By reduction of compounds having the structural formulas

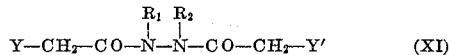
$$Y—CH_2—CO—N—N—CO—CH_2—Y' \quad (XI)$$

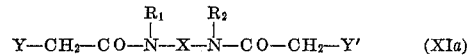
$$Y—CH_2—CO—N—X—N—CO—CH_2—Y' \quad (XIa)$$

or

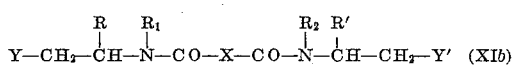
$$Y—CH_2—CH—N—CO—X—CO—N—CH—CH_2—Y' \quad (XIb)$$

wherein R, R', $R_1$, $R_2$, Y, Y' and X have the meanings previously defined, with a hydrogenating agent, preferably lithium-aluminum hydride.

The bis-carboxylic acid amides having the above general formulas XI, XIa and XIb are new, but may be produced by customary methods known per se.

The new compounds having Formulas I, Ia and Ib may be transferred into their acid addition salts in customary fashion; their monosalts as well as their bis-salts may be produced. To the extent that the compounds in accordance with the invention find use in therapy, only those acid addition salts with organic or inorganic acids are suitable which are non-toxic and physiologically acceptable.

The following examples are intended to illustrate the invention, without limiting it to the particular embodiments described therein. The amounts of the reagents are given in parts by weight.

EXAMPLE 1

*N,N'-bis-(7-Ethyl-Theophylline)-Hydrazine*

A mixture of 24.2 parts 7-(β-chloro-ethyl)-theophylline and 5 parts hydrazine hydrate was gradually heated to 100° C.; the reaction mixture, which became homogeneous, was then slowly heated further until the temperature reached about 120° C. The exothermic reaction which commenced at this point caused the temperature to rise to about 145° C. The melt was then allowed to cool to about 100° C. and thereafter was boiled with 50 parts water under reflux. After cooling, the snow white reaction product having the structural formula

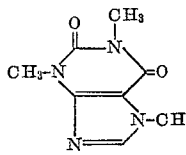 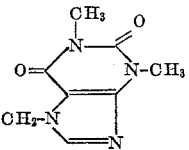

was separated. The yield was 18.3 parts, which corresponds to 83% of theory.

Recrystallized from dimethyl-formamide, the product had a melting point of 236 to 238° C. Its monohydrobromide had a melting point of 235° C. and was readily soluble in water.

EXAMPLE 2

*N,N'-bis-(7-Ethyl-Theophylline)-Ethylenediamine*

24.25 parts 7-(β-chloro-ethyl)-theophylline were heated to 100° C. with 9 parts of ethylenediamine; at this point the exothermic reaction commenced and raised the temperature to 160° C. After cooling to 100° C., the reaction mixture was triturated with water and the reaction product having the structural formula

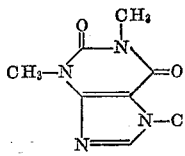 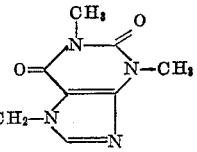

was separated. Its melting point was 215 to 216° C.; its bis-hydrochloride melted at 284° C.

EXAMPLE 3

*N,N'-Bis-(7-Ethyl-Theophylline)-Trimethylenediamine*

242 parts of 7-(β-chloro-ethyl) theophylline were heated with 78.5 parts trimethylenediamine to a temperature of 80 to 120° C. in a reaction vessel provided with a stirrer, thermometer and cooler. Thereafter, the homogeneous reaction mixture was stirred without exterior heating, whereby the temperature rose to about 200° C. and the reaction mixture solidified into a crystalline slurry. The slurry was allowed to cool to 120° C. and then about 400 parts boiling water were added, whereby everything went into solution. The cooled solution was stirred with 100 parts sodium sulfate and the oily precipitate formed thereby was taken up in chloroform. After separation of the chloroform solution the chloroform was evaporated therefrom, leaving behind 205 parts of the reaction product having the structural formula

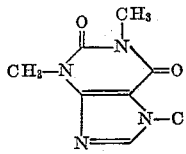 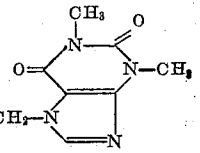

in crystalline form, which corresponds to 84% of theory. Recrystallized from alcohol and dioxan, the product had a melting point of 185 to 188° C. Its bis-hydrochloride had a melting point of 260 to 270° C. (sintering beginning at 200° C.).

EXAMPLE 4

*N,N'-Bis-(7-Ethyl-Theophylline)-Tetramethylenediamine*

24.2 parts of 7-(β-chloro-ethylene)-theophylline and 9.5 parts tetramethylenediamine were heated to a temperature of 85 to 195° C., yielding a reaction mixture which was boiled under reflux with chloroform. The tetramethylenediamine-hydrochloride remained undissolved and was separated by vacuum filtration. After evaporating the filtrate, 24 parts of the reaction product having the structural formula

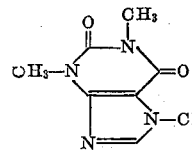 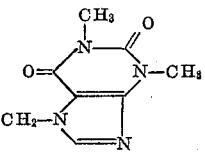

were obtained, which represents 96% of theory. The product was transformed by customary methods into its bis-hydrochloride having a melting point of 276 to 280° C.

EXAMPLE 5

*N,N'-Bis-(7-Ethyl-Theophylline)-Pentamethylenediamine*

This product was obtained by using a procedure analogous to that described in Example 4, except that pentamethylenediamine was used instead of tetramethylenediamine. The reaction product had the structural formula

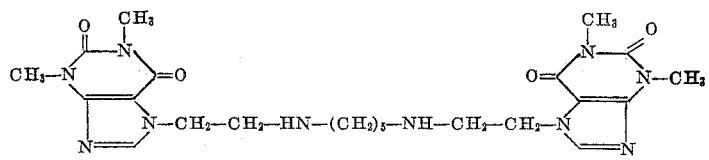

EXAMPLE 6

*N,N'-Bis-(7-Ethyl-Theophylline)-Hexamethylenediamine*

(a) 242.5 parts of 7-(β-chloro-ethyl)-theophylline and 120 parts hexamethylenediamine were stirred into a homogeneous melt at 80 to 90° C. in a suitable reaction vessel. After a few minutes the temperature was increased to about 100° C., accompanied by vigorous stirring, at which point the reaction commenced. Without further heating, the temperature rose to about 210° C. and the reaction mixture crystallized. After cooling to about 120° C., the reaction mixture was stirred with 400 cc. hot water, whereby the entire reaction mixture went into solution. After allowing the solution to cool, it was shaken with chloroform, whereby the reaction product dissolved in the chloroform phase. After separating the chloroform phase and evaporating the solvent, 234 parts of a crystalline substance having the structural formula

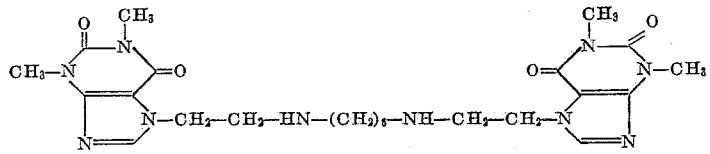

were obtained, which corresponds to a yield of 80% of theory. Recrystallized from alcohol, the product had a melting point of 170 to 171° C. Its bis-hydrochloride melted at 276 to 280° C. and was readily soluble in water. The bis-salt with nicotinic acid, which was also readily water-soluble, had a melting point of 210° C.

(b) 242.5 parts of 7-(β-chloroethyl)-theophylline were heated in about 1.5 liters methanol with 60 parts hexamethylenediamine in a stirrer autoclave by slowly increasing the temperature to about 150 to 160° C. As soon as the resulting solution was neutral, that is after about 4 to 5 hours, the major amount of the methanol was distilled off in vacuo and the residue was triturated with alcohol or acetone and vacuum filtered. The bis-hydrochloride of the reaction product having the structural formula shown under (a) above with a melting point of 276 to 280° C., was obtained with a yield of about 80% of theory.

EXAMPLE 7

*N,N'-Bis-(7-Ethyl-Theophylline)-Heptamethylenediamine*

Using a procedure analogous to that described in Example 4, but substituting heptamethylenediamine for tetramethylenediamine, a reaction product of the structural formula

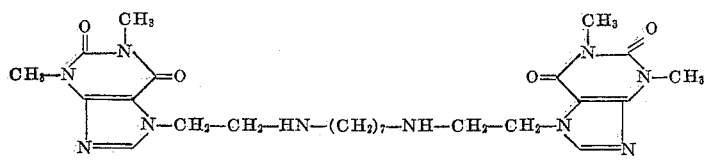

was obtained. Its bis-hydrochloride had a melting point of 130 to 135° C.

EXAMPLE 8

*N,N'-Bis-(7-Ethyl-Theophylline)-Octamethylenediamine*

Using a procedure analogous to that described in Example 4, but substituting octamethylenediamine for tetramethylenediamine, a reaction product having the structural formula

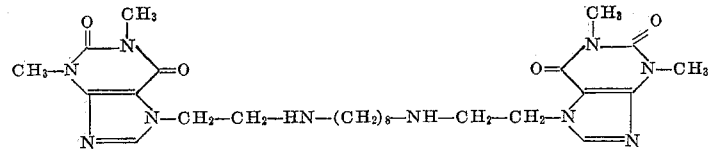

was obtained; its melting point of 143 to 146° C. Its bis-hydrochloride had a melting point of 240 to 244° C.

EXAMPLE 9

*N,N'-Bis-(7-Ethyl-Theophylline)-Nonamethylenediamine*

Using a procedure analogous to that of Example 4, but substituting nonamethylenediamine for tetramethylenediamine, a reaction product having the structural formula

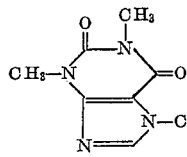 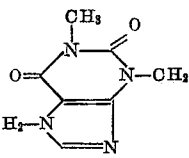

was obtained. Its bis-hydrochloride had a melting point of 196 to 198° C.

EXAMPLE 10

N,N'-Bis-(7-Ethyl-Theophylline)-Decamethylenediamine

Using a procedure analogous to that of Example 4, but substituting decamethylenediamine for tetramethylenediamine, a reaction product having the structural formula

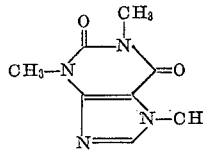 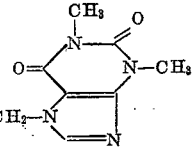

was obtained which, recrystallized from alcohol, had a melting point of 124 to 126° C. Its bis-hydrochloride had a melting point of 230 to 234° C.

EXAMPLE 11

N,N'-Bis-(7-Ethyl-Theophylline)-Dodecamethylenediamine

Using a procedure analogous to that of Example 4, but substituting dodeca-methylenediamine for tetramethylenediamine, a reaction product having the structural formula

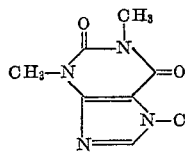 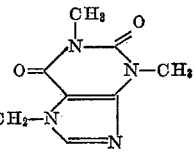

was obtained whose bis-hydrochloride, recrystallized from a mixture of methanol and ethanol had a melting point of 225 to 228° C.

EXAMPLE 12

N,N'-Bis-(7-Ethyl-1,3-Diethyl-Xanthine)-Hexamethylenediamine

A mixture of 5.42 parts of 7-(β-chloro-ethyl)-1,3-diethyl-xanthine and 2.4 parts hexamethylenediamine was carefully melted at 100° C. until homogeneous. Without further exterior heating, the reaction commenced and the temperature rose to about 210° C. Thereafter, the crystalline reaction mixture was allowed to cool to 90° C. and was then refluxed with chloroform until hexamethylenediamine hydrochloride separated out as a white precipitate; the precipitate was separated by vacuum filtration and the chloroform was evaporated from the filtrate. The pasty reaction product having the structural formula

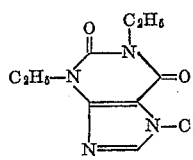 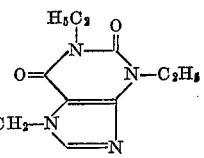

was transformed by customary methods into its bis-hydrochloride having a melting point of 214 to 215° C.

EXAMPLE 13

N,N'-Bis-(1-Ethyl-Theobromine)-Hexamethylenediamine 12.2 parts of 1-(β-chloro-ethyl)-theobromine were admixed with 6 parts hexamethylenediamine and the mixture was homogenized by heating it to 90 to 100° C. Upon slowly increasing the temperature to 130° C. the reaction commenced and the temperature rose to 210° C. The resulting melt was cooled to about 80° C., admixed with about 50 cc. water and heated, and the resulting solution was made alkaline with concentrated sodium hydroxide. The reaction product which separated out in the form of a viscous oil was isolated by extraction with chloroform. It had the structural formula

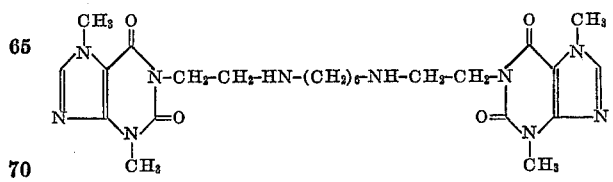

Yield: 12.4 parts, which corresponds to 94% of theory. Recrystallized from ethanol by addition of ether, it had a melting point of 155 to 158° C. Its bis-hydrochloride had a melting point of 302 to 305° C. and was readily soluble in water.

EXAMPLE 14

*N,N'-Diethyl-N,N'-Bis-(7-Ethyl-Theophylline)-Ethylenediamine*

24.5 parts of 7-(β-chloro-ethyl)-theophylline were heated with 11.6 parts N,N'-diethyl-ethylene-diamine to 140 to 160° C. By boiling the reaction mixture with chloroform, the reaction product having the structural formula

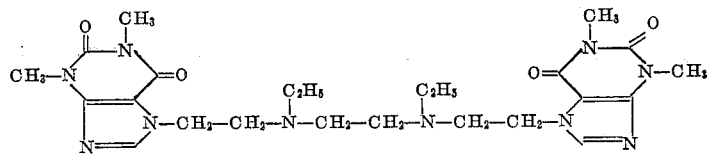

was isolated and was then transformed into its crystalline bis-hydrochloride. The acid addition salt had a melting point of 172 to 173° C.

EXAMPLE 15

*N,N'-Diethyl-N,N'-Bis-(7-Ethyl-Theophylline)-Hexamethylenediamine*

24.5 parts of 7-(β-chloro-ethyl)-theophylline were heated with 17.2 parts N,N'-diethyl-hexamethylenediamine to 100 to 190° C. and the reaction product was isolated by boiling the reaction mixture with chloroform. The initially syruppy reaction product (87% of theory) was transformed into a crystalline form by treatment with hot alcohol. The crystalline product had the structural formula

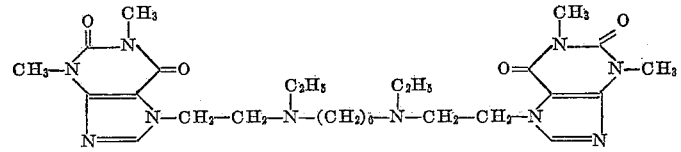

and a melting point of 134 to 136° C. Its bis-hydrochloride had a melting point of 254 to 255° C.

EXAMPLE 16

*N,N'-Bis-(7-Ethyl-Theophylline)-Piperazine*

24.5 parts of 7-(β-chloro-ethyl)-theophylline were heated with 8.6 gm. piperazine at 90 to 170° C. The reaction mixture was allowed to cool to 60° C. and was then boiled with 80 cc. alcohol; after cooling, the mixture was vacuum filtered and the filter cake was digested with cold water. The crystalline reaction product had the structural formula

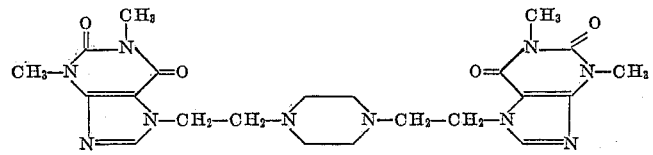

and a melting point of 247 to 248° C. Its bis-hydrochloride had a melting point of 310 to 312° C.

EXAMPLE 17

*N,N'-Bis-[7-(β-Propyl)-Theophylline]-Trimethylene-Diamine*

A mixture of 59 parts of 7-acetonyl-theophylline, 300 parts chloroform and 10 parts trimethylenediamine was heated to its boiling point and the water split off by the reaction was slowly distilled off together with a portion of the solvent. Thereafter, the reaction solution was evaporated in vacuo and the bis-Schiff's base having a melting point of 174 to 176° C. obtained thereby was dissolved in 250 parts alcohol and 15 parts water. The solution was then hydrogenated with hydrogen in the presence of 0.6 part platinum black at about 100° C. and a pressure of 150 atmospheres gauge. After the theoretical amount of hydrogen had been absorbed the catalyst was filtered off and the virtually colorless solution was evaporated in vacuo. The reaction product having the structural formula

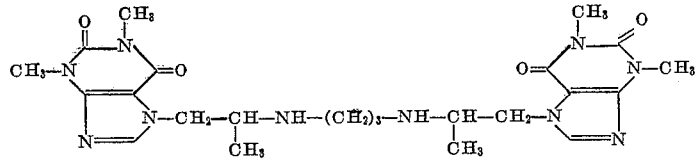

was obtained with a virtually quantitative yield and was then transformed into its bis-hydrochloride by customary means. Yield: 63.8 parts, which corresponds to 87% of theory. The melting point of the bis-hydrochloride, recrystallized from a mixture of methanol and ethanol, was 275° C.

The compounds according to the present invention, i.e. the disubstituted diamines represented by Formulas I, Ia and Ib above and their non-toxic, pharmacologically acceptable acid addition salts, exhibit useful therapeutic properties, and more particularly broncholytic activities. Typical examples of pharmacologically acceptable, non-toxic acid addition salts of the present disubstituted diamines are the mono- and bis-addition salts formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid and the like.

While we have illustrated the present invention with the aid of certain representative embodiments thereof, it will be readily apparent to those skilled in the art that our invention is not limited to those embodiments, and that various changes and modifications may be made without departing from the spirit of the invention or the scope of the appended claims.

We claim:
1. Compounds selected from the group consisting of disubstituted diamines having a structural formula selected from the group consisting of

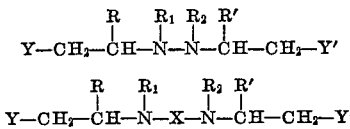

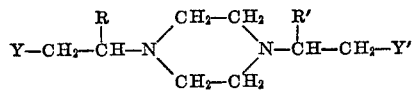

and

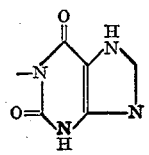

wherein
R and R' are selected from the group consisting of hydrogen and alkyl with 1–5 carbon atoms,
$R_1$ and $R_2$ are selected from the group consisting of hydrogen and alkyl,
X is selected from the group consisting of alkylene with 1 to 12 carbon atoms, lower alkyl-substituted alkylene with 1 to 12 carbon atoms and cyclohexamethylene, and
Y and Y' are selected from the group consisting of

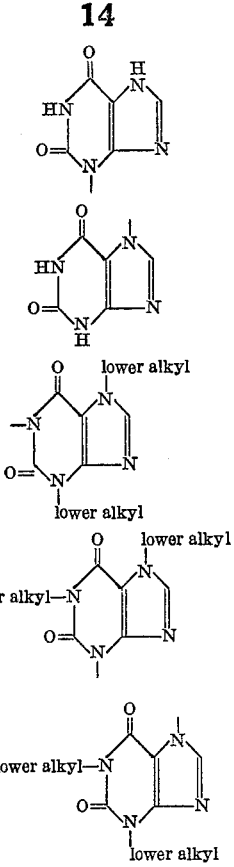

and their non-toxic, pharmacologically acceptable acid addition salts.

2. N,N'-bis - [β - (1,3 - dimethyl-xanthine-yl-7)-ethyl]-trimethylenediamine.
3. N,N'-bis - [β - (1,3 - dimethyl-xanthine-yl-7)-ethyl]-tetramethylenediamine.
4. N,N'-bis - [β - (1,3 - dimethyl-xanthine-yl-7)-ethyl]-hexamethylenediamine.
5. N,N'-bis - [β - (1,3 - dimethyl-xanthine-yl-7)-ethyl]-octamethylenediamine.
6. N,N'-bis - [β - (1,3 - dimethyl-xanthine-yl-7)-ethyl]-nonamethylenediamine.

No references cited.

UNITED STATES PATENT OFFICE
CERTIFICATE OF CORRECTION

Patent No. 3,030,363                      April 17, 1962

Wilhelm Konz et al.

It is hereby certified that error appears in the above numbered patent requiring correction and that the said Letters Patent should read as corrected below.

Column 3, line 12, for "Compound III" read -- Compound II --; column 7, line 19, after the formula in Example 5, insert -- its bis-hydrochloride had a melting point of 270 to 272° C. --; same column 7, in the first line after the formula of Example 6, for "80%" read -- 89% --; column 9, at the far right-hand side of the formula for Example 9, for "N-CH$_2$" read -- N-CH$_3$ --.

Signed and sealed this 14th day of August 1962.

(SEAL)
Attest:

ERNEST W. SWIDER                      DAVID L. LADD
Attesting Officer                      Commissioner of Patents